United States Patent
Kornbluth et al.

(10) Patent No.: US 12,330,965 B2
(45) Date of Patent: Jun. 17, 2025

(54) ANTI-CORROSIVE, ANTI-REACTIVE CURRENT CONDUCTORS FOR ELECTROCHEMICAL DEVICES FOR REMOVING IONS FROM SOLUTIONS

(71) Applicant: Robert Bosch GmbH, Stuttgart (DE)

(72) Inventors: Mordechai Kornbluth, Brighton, MA (US); Daniil Kitchaev, Brookline, MA (US); Jake Christensen, Elk Grove, CA (US); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 17/503,867

(22) Filed: Oct. 18, 2021

(65) Prior Publication Data

US 2023/0124773 A1    Apr. 20, 2023

(51) Int. Cl.
*C02F 1/469* (2023.01)
*C02F 1/461* (2023.01)

(52) U.S. Cl.
CPC .......... *C02F 1/469* (2013.01); *C02F 1/46104* (2013.01); *C02F 1/4691* (2013.01); *C02F 2001/46133* (2013.01)

(58) Field of Classification Search
CPC .................................................. C02F 1/4691
See application file for complete search history.

(56) References Cited

U.S. PATENT DOCUMENTS

| | | | |
|---|---|---|---|
| 10,988,391 B2 | 4/2021 | Kim et al. | |
| 2015/0239756 A1* | 8/2015 | Jikihara | C02F 1/46109 204/674 |
| 2015/0306570 A1 | 10/2015 | Mayes et al. | |
| 2018/0148355 A1* | 5/2018 | Smith | B01D 61/422 |
| 2020/0123027 A1 | 4/2020 | Kornbluth et al. | |
| 2020/0123028 A1 | 4/2020 | Kim et al. | |
| 2020/0123029 A1 | 4/2020 | Kornbluth et al. | |

(Continued)

FOREIGN PATENT DOCUMENTS

GB    2114162 A  *  8/1983  ............. C23C 22/74

OTHER PUBLICATIONS

Song et al., "Influence of Magnesium Ions in the Seawater Environment on the Improvement of the Corrosion Resistance of Low-Chromium-Alloy Steel" Materials, vol. 11, No. 162, Jan. 20, 2018, pp. 1-18, DOI:10.3390/ma11010162.

(Continued)

*Primary Examiner* — Salil Jain
(74) *Attorney, Agent, or Firm* — Brooks Kushman P.C.

(57) ABSTRACT

A current conductor for use in an electrochemical device for removing ions from a solution. The current conductor includes a current conductor substrate having a current conductor surface. The current conductor also includes an anti-corrosive, anti-reactive coating coated onto the current conductor surface. The anti-corrosive, anti-reactive coating contains a material with a chemical composition of $AO_y$, where A=Zr, Nb, Ti, or a combination thereof and $2<y<3$; $M_xAO_y$, where M=Ca, Mg, Na, or a combination thereof, A=Zr, Nb, Ti, or a combination thereof, $0<x<2$, and $2<y<3$; $MgCr_2O_4$; or a combination thereof.

19 Claims, 4 Drawing Sheets

(56) References Cited

U.S. PATENT DOCUMENTS

| | | |
|---|---|---|
| 2020/0131058 A1 | 4/2020 | Kim et al. |
| 2020/0148560 A1 | 5/2020 | Hellstrom et al. |
| 2020/0399149 A1 | 12/2020 | Kim et al. |
| 2021/0039970 A1 | 2/2021 | Metzger et al. |
| 2021/0198124 A1 | 7/2021 | Metzger et al. |

OTHER PUBLICATIONS

International Search Report issued in PCT/EP2022/078504, dated Feb. 6, 2023, 5 pages.

\* cited by examiner

ANTI-CORROSIVE, ANTI-REACTIVE CURRENT CONDUCTORS FOR ELECTROCHEMICAL DEVICES FOR REMOVING IONS FROM SOLUTIONS

TECHNICAL FIELD

The present disclosure relates to anti-corrosive, anti-reactive current conductors for electrochemical devices for removing ions from solutions.

BACKGROUND

The demand for fresh, potable water for human consumption, agriculture, industry, and other uses continues to increase while natural sources of high-quality water are becoming increasingly limited. Removing salt and other impurities from seawater and/or industrial water, which is referred to as a desalination process, is one important technology to secure fresh water, in addition to the tradition thermal (e.g., drying process) and mechanical (e.g., reverse osmosis) processes.

SUMMARY

According to one embodiment, a current conductor for use in an electrochemical device for removing ions from a solution is disclosed. The current conductor includes a current conductor substrate having a current conductor surface. The current conductor also includes an anti-corrosive, anti-reactive coating coated onto the current conductor surface. The anti-corrosive, anti-reactive coating contains a material with a chemical composition of $AO_y$, where $A=Zr$, Nb, Ti, or a combination thereof and $2<y<3$; $M_xAO_y$, where $M=Ca$, Mg, Na, or a combination thereof, $A=Zr$, Nb, Ti, or a combination thereof, $0<x<2$, and $2<y<3$; $MgCr_2O_4$; or a combination thereof.

In a second embodiment, an electrochemical device for removing ions from a solution is disclosed. The electrochemical device includes first and second compartments divided by a first anion exchange membrane. The first and second compartments includes first and second electrodes, respectively. The first and second compartments include first and second current conductors, respectively. The first compartment is configured to admit a first inlet stream of the solution and provide a first outlet stream of the solution. The second compartment is configured to admit a second inlet stream of the solution and provide a second outlet stream of the solution. The first outlet stream is an ion-poor stream and the second outlet stream is an ion-rich stream. The second conductor includes a second current conductor substrate having a second current conductor surface and an anti-corrosive, anti-reactive coating coated onto the second current conduct surface. The anti-corrosive, anti-reactive coating contains a second material with a second chemical composition of $AO_y$, where $A=Zr$, Nb, Ti, or a combination thereof and $2<y<3$; $M_xAO_y$, where $M=Ca$, Mg, Na, or a combination thereof, $A=Zr$, Nb, Ti, or a combination thereof, and $0<x<2$, and $2<y<3$; $MgCr_2O_4$; or a combination thereof.

In a third embodiment, a method of applying an anti-corrosive, anti-reactive coating onto a current conductor surface of a current conductor substrate of a current conductor for use in an electrochemical device for removing ions from a solution is disclosed. The method includes applying the anti-corrosive, anti-reactive coating onto the current conductor surface. The anti-corrosive, anti-reactive coating contains a material with a chemical composition of $AO_y$, where $A=Zr$, Nb, Ti, or a combination thereof, and $2<y<3$; $M_xAO_y$, where $M=Ca$, Mg, Na, or a combination thereof, $A=Zr$, Nb, Ti, or a combination thereof, $2<y<3$, and $0<x<2$; $MgCr_2O_4$; or a combination thereof.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within +5% of the value. As one example, the phrase "about 100" denotes a range of 100+5, i.e., the range from 95 to 105. Generally, when the term "about" is used, it can be expected that similar results or effects according to the invention can be obtained within a range of +5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Clean, potable water is important and sometimes difficult to obtain. Different desalination and softening approaches have certain benefits and drawbacks, for example, with respect to waste and consumables. . . . One recent consumable-free approach is intercalative deionization (IDI). In this approach, a voltage is applied across a water channel, allowing cations to segregate to one side and anions to the other side. In one embodiment, ions are each captured by a respective type of electrode (e.g., a cation capture material captures cations and an anion capture material captures anions).

Figure 1A:
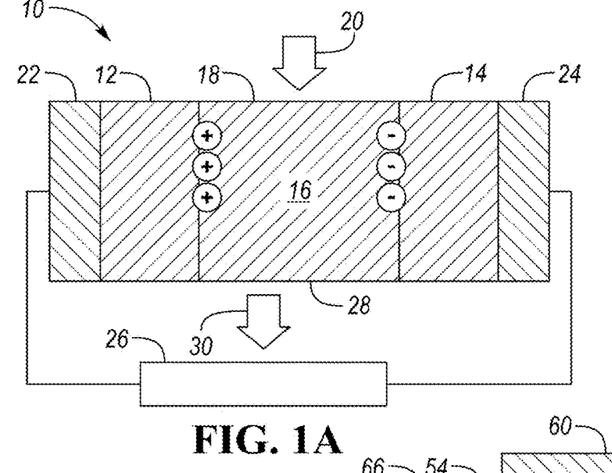
FIG. 1A depicts a schematic diagram of an intercalative desalination (IDI) system.

FIG. 1A depicts a schematic diagram of IDI system 10. IDI system 10 includes cation capture electrode 12 including one or more cation capture materials and anion capture electrode 14 including one or more anion capture materials. Cation capture electrode 12 is spaced apart from anion capture electrode 14 to form channel 16 for flowing a feed solution introduced through inlet 18 as represented by arrow 20. Non-limiting examples of feed solutions include saltwater and brackish water. IDI system 10 further includes first and second current conductors 22 and 24. Non-limiting examples of current conductors include current collectors and flow field plates (e.g., bipolar plates). First current conductor 22 contacts a side of cation capture electrode 12 opposing a second side adjacent to channel 16. Second current conductor 24 contacts a side of anion capture electrode 14 opposing a second side adjacent to channel 16. As a voltage bias is applied by voltage source 26 to cation capture electrode 12 and anion capture electrode 14, cations (e.g., $Na^+$, $Ca^{2+}$, and $Mg^{2+}$) in the feed solution migrate to cation capture electrode 12 and anions (e.g., $Cl^-$ and $CO_3^{2+}$) migrate to anion capture electrode 14, with a water flow of clean water (e.g., desalinated water or softened water) exiting outlet 28 as represented by arrow 30.

The one or more cation capture materials may include one or more Prussian Blue Analog (PBA) materials with the following formula: $M^I[M^{II}(CN)_6]_x$, where $M^I$ and $M^{II}$ are transition-metal elements or a mixture thereof, and x is a mixing value of about 0.75. Because one or more anion capture materials may not be available for certain applications, in another embodiment, the anions may move through an anion exchange membrane (AEM), separating the output into first and second streams (e.g., a clean, ion-poor stream and an ion-rich stream not suitable for drinking).

Figure 1B:
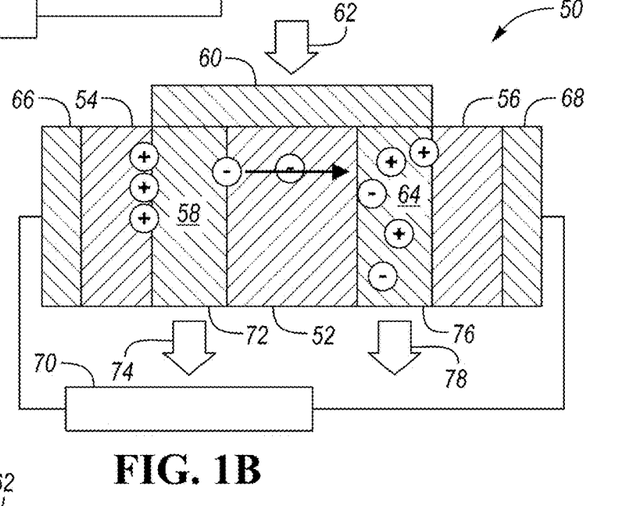
FIG. 1B depicts a first half-cycle operation of an IDI system configured for reversible operation.
Figure 1C:
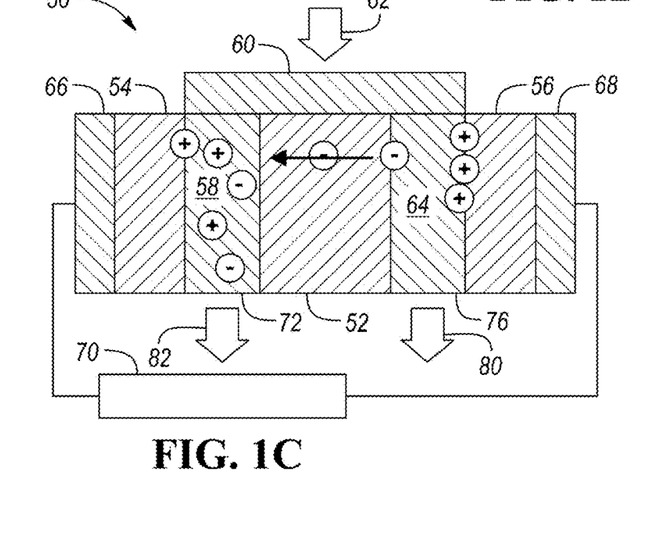
FIG. 1C depicts a second half-cycle operation of an IDI system configured for reversible operation.

FIGS. 1B and 1C depict a schematic diagram of IDI system 50 including anion exchange membrane (AEM) 52. IDI system 50 includes first and second cation capture electrodes 54 and 56. First cation capture electrode 54 includes one or more cation capture materials. Second cation capture electrode 56 includes one or more cation capture materials. First cation capture electrode 54 is spaced apart from AEM 52 to form first channel 58 for flowing a first portion of a feed solution introduced through inlet 60 as represented by arrow 62. Non-limiting examples of feed solutions include saltwater and brackish water. Second cation capture electrode 56 is spaced apart from AEM 52 to form second channel 64 for flowing a second portion of the feed solution introduced through inlet 60. As shown in FIGS. 1B and 1C, the design of IDI system 50 is symmetrical. IDI system 50 further includes first and second current conductors 66 and 68. First current conductor 66 contacts a side of first cation capture electrode 54 opposing a second side adjacent to first channel 58. Second current conductor 68 contacts a side of second cation capture electrode 56 opposing a second side adjacent to second channel 64.

In one or more embodiments, IDI system 50 is configured for reversible operation. FIG. 1B depicts a first half-cycle operation of IDI system 50 and FIG. 1C depicts a second half-cycle operation of IDI system 50. During the first half-cycle operation, a voltage bias is applied by voltage source 70 to intercalate cations (e.g., $Na^+$, $Ca^{2+}$, and $Mg^{2+}$) in first cation capture electrode 54 and to migrate anions (e.g., $Cl^-$ and $CO_3^{2+}$) across AEM 52 into second channel 64, thereby generating a clean, ion-poor stream exiting IDI system 50 through first outlet 72 as represented by arrow 74 and an ion-rich stream not suitable for drinking exiting IDI system 50 through second outlet 76 as represented by arrow 78. At the end of the first half-cycle operation, the voltage bias applied by voltage source 70 is flipped and IDI system 50 operated in reverse. In the second half-cycle operation, as shown in FIG. 1C, intercalated cations from first cation capture electrode 54 are released and anions migrate from second channel 64 through AEM 52 to first channel 58, thereby reversing the clean, ion-poor stream such that it exits IDI system 50 through second outlet 76 as represented by arrow 80 and the ion-rich stream not suitable for drinking exiting IDI system 50 through first outlet 72 as represented by arrow 82.

As a drawback of IDI systems, unwanted reactions may occur, which are generally referred to as corrosion, because of the ion-rich operating environment of the IDI system. These unwanted reactions may occur as electrochemical reactions between the ions in the solution and the surface of one or more of the current conductors. The water source used with the IDI system may not have a neutral pH, thereby leading to elevated levels of $H^+$ or $OH^-$ ions, which could further increase the negative effect of unwanted reactions.

Considering the foregoing, it is desirable to find one or more materials for surface coatings on current conductors of IDI systems or other electrochemical devices for water desalination and/or softening (e.g., capacitive intercalating deionization (CDI)) such that the surface coatings resist corrosion of the current conductor in a feed solution (e.g., brackish or seawater) environment and do not undergo side reactions with the ions present in the IDI system or other electrochemical device. Non-limiting examples of current conductors include current collectors and flow field plates (e.g., bipolar plates). In one or more embodiments, a process of determining such materials may use a data-driven materials screening approach. In one or more embodiments, the anti-corrosive, anti-reactive material may be one or more transition metal oxides.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Table 1 below identifies one or more reactions to avoid for a candidate material M.

TABLE 1

| Reaction | Description |
| --- | --- |
| $M + H \rightarrow MH$<br>$MO_{0.5} + H \rightarrow$<br>$M + \frac{1}{2}H_2O$ | Corrosion in a reducing environment (e.g., against H). In one or more embodiments, this reaction is used as a proxy for other reducing conditions. |
| $M + OH \rightarrow MOH$<br>$M + 2OH \rightarrow$<br>$MO_2 + H_2$<br>$\frac{1}{2}M + OH \rightarrow$<br>$\frac{1}{2}H_2O + \frac{1}{2}MO$ | Corrosion in an oxidizing environment (e.g., against OH). In one or more embodiments, this is used as a proxy for other oxidizing conditions. |
| $M + H_2O \rightarrow MH_2O$ | In one or more embodiments, candidate materials Ms are targeted that are stable against water. |
| $M + X \rightarrow MX$, where X = Na, Ca, Cl, or Mg | Intermetallic formation or other unwanted side reactions with the ions expected to be present. |

In one or more embodiments, a process includes one or more steps used to compute total energies using density functional theory (DFT), which solves a system of electronic interactions for a ground-state energy of a material. Non-limiting examples of databases used in DFT analysis include without limitation the Materials Project database. These databases of energies permit screening of a large class of materials using different data analysis techniques.

For example, a total energy of a computed structure relates to a computed energy of a structure and can be represented in eV/atom or eV. The differences in energy between the structures may correspond to a reaction energy between the structures relating to the reaction. For example, the reaction of A→B has a reaction energy $E_B-E_A$ (where the energies may be represented in KJ/mol).

In one or more embodiments, a convex-hull decomposition may be generated from the data in a database of energy. The step may include constructing a convex hull of all stable compositions, such that each chemical composition C has a minimum combination of stable states, C→A+B, where the stoichiometric formula C is equal to the sum of A and B, and there is no other A'+B' that has a lower energy. A+B are the convex-hull decomposition products of C. If the energy of C is known, then the hull energy or decomposition energy (where the energies may be represented in eV/atom or eV) is $E_h = E_C - E_A - E_B$, where $E_h$ is a non-negative number. This can also be reported as a different convention as the reaction energy $E_{rxn} = E_A + E_B - E_C$, where $E_{rxn}$ is a non-positive number.

In one or more embodiments, the total energy and convex-hull decomposition quantities are used to analyze various classes of materials. One or more of the DFT databases may be used to compute a DFT structure of materials in the databases. Non-limiting examples of these materials include single-crystal or gas-phase molecules.

In one or more embodiments, the total energy and/or convex-hull decomposition quantities are used to compute one or more properties. One example of a property is stability at a fixed temperature. This value may be given by the hull energy. If the hull energy is less than the temperature (times the Boltzmann constant kB), then the material may be considered stable. In another embodiment, stability at a fixed temperature can be computed by an oxygen chemical potential, which can be benchmarked to a temperature at a known scale. The total energy and/or convex-hull decomposition quantities may be used to filter materials by atom size, oxidation state, metal-oxygen ratio, crystal structure, space-group, and/or elements.

In one or more embodiments, the process may also use reactivity screening. Reactivity screening may refer to the likelihood of a reactivity between a composition C and a reactant R. Using the convex-hull methodology, the reactivity may be computed by examining (1) the decomposition products of a composition C+x R, and (2) the relative decomposition energy of $\varepsilon(x) = E(C + x\ R) - E(C) - x\ E(R)$, which produces a non-positive number. The most stable (MS) reaction is the one with the minimum $\varepsilon$, while the dilute limit is the lowest value of x that has a nonzero E.

Figure 2A:
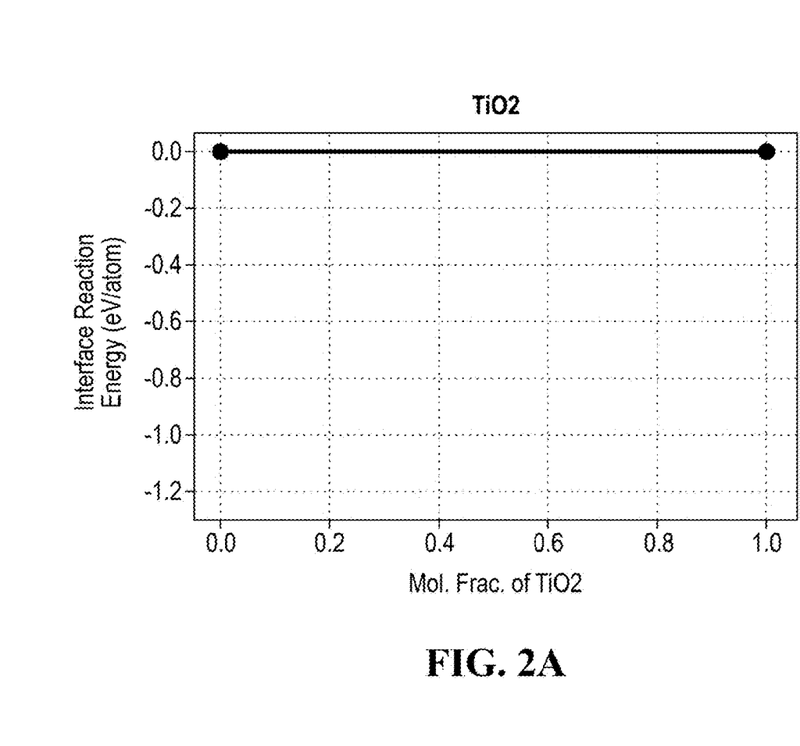
FIGS. 2A through 2E depict graphs of interface reaction energy (eV/atom) of certain reactants as a mole fraction of different compounds being examined using the relative decomposition energy of $\varepsilon(x)=E(C+x\,R)-E(C)-x\,E(R)$.
Figure 2B:
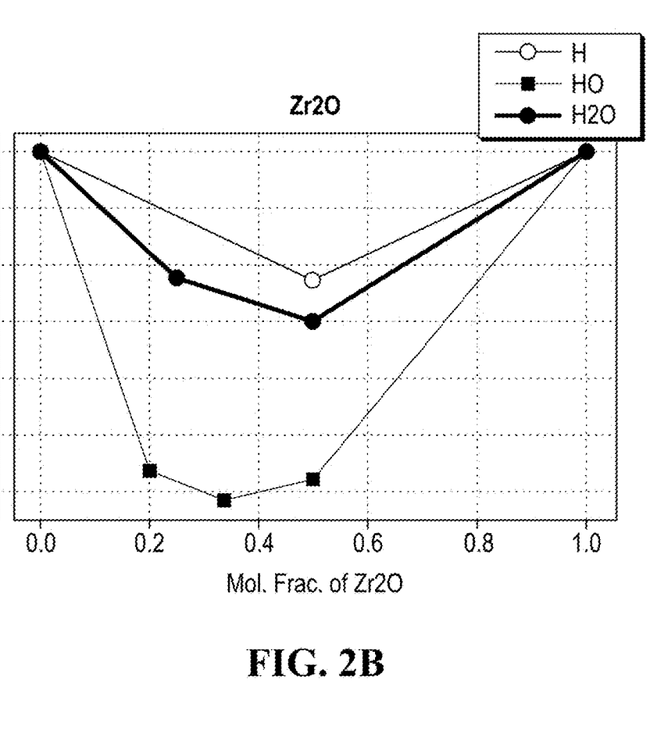
Figure 2C:
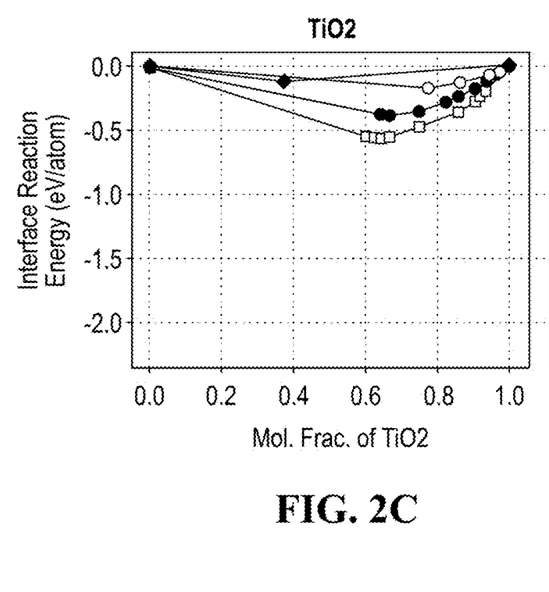
Figure 2D:
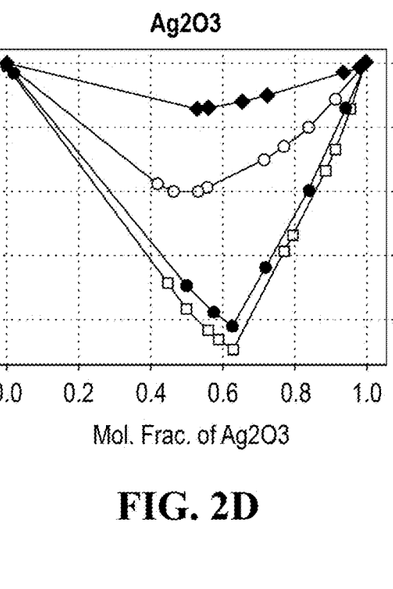
Figure 2E:
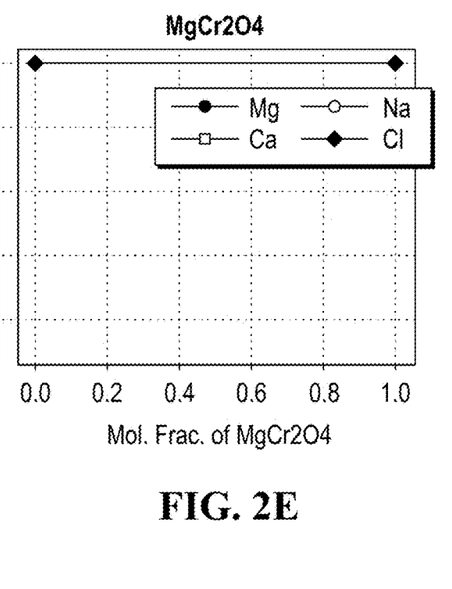

FIGS. 2A through 2E depict graphs of interface reaction energy (eV/atom) of certain reactants as a mole fraction of different compounds being examined using the relative decomposition energy of $(x) = E(C + x\ R) - E(C) - x\ E(R)$. FIG. 2A depicts the interface reaction energy (eV/atom) of H, HO, and $H_2O$ as a mole fraction of $TiO_2$. FIG. 2B depicts the interface reaction energy (eV/atom) of H, HO, and $H_2O$ as a mole fraction of $Zr_2O$. FIG. 2C depicts the interface reaction energy (eV/atom) of Mg, Ca, Na, and Cl as a mole fraction of $TiO_2$. FIG. 2D depicts the interface reaction energy (eV/atom) of Mg, Ca, Na, and Cl as a mole fraction of $Ag_2O_3$. FIG. 2E depicts the interface reaction energy (eV/atom) of Mg, Ca, Na, and Cl as a mole fraction of $MgCr_2O_4$.

In one or more embodiments, a reactivity may be benchmarked to a known material C' using the following two quantities: (1) the molar fraction x where reaction occurs; and (2) the relative decomposition energy $\varepsilon$. Regarding (1), a higher reactivity is associated with a higher value of x, e.g., more of a reaction occurs per molar unit of C (or C'). The following equation may be utilized in determining the molar fraction x where reaction occurs: $RR_{stoich} = x_C/x_{C'}$, where C' is the reference material and $RR_{stoich}$ stands for the relative reactivity. Regarding (2), a higher reactivity is associated with a lower value of $\varepsilon$ (e.g., higher absolute value), e.g., the reaction is more energetically favorable. The following equation may be utilized in determining the relative decomposition energy $\varepsilon$: $RR_{en} = \varepsilon_C/\varepsilon_{C'}$, where C' is the reference material. Another equation that can be utilized in determining the relative decomposition energy $\varepsilon$ is $RR_{en} = (\varepsilon_{C'} - \varepsilon_C)/k_B T$, where $k_B$ is the Boltzmann constant and T is the absolute temperature. The reference material used in these equations may be $TiO_2$, which is expected to be resistant to corrosion.

In one or more embodiments, one or more screening parameters may be used in the process to classify a material as "good" or "bad." For instance, three screening parameters may be used: (1) corrosion stability; (2) ion stability; and (3) cost. The objective of corrosion stability is to avoid or minimize reactions against $H_2O$ (water), H (reducing conditions), or OH (oxidizing conditions). The objective of ion stability is to avoid reactions against elements expected to be present in the screened material as ions (e.g., $Na^+$, $Ca^{2+}$, $Mg^{2+}$, and $Cl^-$). In some embodiments, $CO_3^{2-}$ may be considered. In other embodiments, $CO_3^{2-}$ may not be considered because its effect (1) is addressed by usual electrochemical corrosion in an acidic environment; and/or (2) forms calcium carbonate (and the like), which does not react directly with an electrode or bipolar plate. While calcium carbonate (and the like) may deposit on electrodes and bipolar plates, the deposition is more dependent on microstructure than chemistry. The objective of cost is minimization thereof. In one embodiment, the elemental cost should be no more than about $40/kg. As a reference, $TiO_2$ is about $10/kg elemental cost.

In one or more embodiments, a search space may be defined by one or more parameters. The material space may include binary and/or ternary transition metal oxides present in a material database, such as the Material Project database. The elements present in the material may only include Mg, Ca, Na, transition metals, oxygen, and/or nitrogen (and exclude radioactive materials). The stoichiometric oxygen (or nitrogen) fraction may be 0.3 to 0.8 for oxides (or nitrides) respectively. The energy above the hull may be no more than 25 meV, corresponding to room temperature stability. The reference material may be $TiO_2$, which is expected to be resistant to corrosion.

Tables 2 and 3 below show examples of the screening of these materials. For the corrosion-type reactions (e.g., H, OH, and $H_2O$), it is found that $TiO_2$ is stable, which is expected, and suboxide $Zr_2O$ is very unstable, which is expected for a suboxide. For the ion-type reactions (e.g., Mg, Ca, Na, and Cl), $TiO_2$ may form various alkali oxides, which is a bad result, and silver is so noble that its oxides will easily oxidize the ions (or form $AgCl_x$), but magnesium chromate is particularly nonreactive.

TABLE 2

| Reactant | Material | Most Stable Reaction | Reactant Ratio (wt) | Reaction Energy (eV/at) |
|---|---|---|---|---|
| H | $TiO_2$ | No reactions found | 0. | 0. |
| HO | $TiO_2$ | No reactions found | 0. | 0. |
| $H_2O$ | $TiO_2$ | No reactions found | 0. | 0. |
| H | $Zr_2O$ | $0.25\ Zr_2O + 0.375\ H_2 \rightarrow 0.375\ ZrH_2 + 0.125\ ZrO_2$ | 0.015 | −0.456 |
| HO | $Zr_2O$ | $0.25\ Zr_2O + 0.375\ H_2O_2 \rightarrow 0.5\ ZrO_2 + 0.375\ H_2$ | 0.257 | −1.235 |
| $H_2O$ | $Zr_2O$ | $0.5\ Zr_2O + 0.5\ H_2O \rightarrow 0.5\ ZrH2 + 0.5\ ZrO_2$ | 0.091 | −0.601 |

TABLE 3

| Reactant | Material | Most Stable (MS) Reaction | MS Reactant Ratio (wt) | MS Reaction Energy (eV/at) |
|---|---|---|---|---|
| Mg | $TiO_2$ | $0.6\ Mg + 0.4\ TiO_2 \rightarrow 0.2\ Ti_2O + 0.6\ MgO$ | 0.456 | −0.38 |
| Ca | $TiO_2$ | $0.625\ Ca + 0.375\ TiO_2 \rightarrow 0.125\ Ti_3O + 0.625\ CaO$ | 0.836 | −0.559 |
| Na | $TiO_2$ | $0.4706\ Na + 0.5294\ TiO_2 \rightarrow 0.2353\ TiO + 0.05882\ Na_8Ti_5O_{14}$ | 0.256 | −0.174 |
| Cl | $TiO_2$ | $0.4167\ Cl_2 + 0.1667\ TiO_2 \rightarrow 0.1667\ TiCl_4 + 0.1667\ ClO_2$ | 2.22 | −0.12 |
| Mg | $Ag_2O_3$ | $0.25\ Ag_2O_3 + 0.75\ Mg \rightarrow 0.5\ Ag + 0.75\ MgO$ | 0.276 | −2.053 |
| Ca | $Ag_2O_3$ | $0.25\ Ag_2O_3 + 0.75\ Ca \rightarrow 0.5\ Ag + 0.75\ CaO$ | 0.456 | −2.243 |
| Na | $Ag_2O_3$ | $0.1429\ Ag_2O_3 + 0.8571\ Na \rightarrow 0.4286\ Na_2O + 0.2857\ Ag$ | 0.523 | −1.005 |
| Cl | $Ag_2O_3$ | $0.1818\ Ag_2O_3 + 0.4091\ Cl_2 \rightarrow 0.2727\ ClO_2 + 0.1818\ Ag_2Cl_3$ | 0.605 | −0.361 |
| Mg | $MgCr_2O_4$ | No reactions found | 0. | 0. |
| Ca | $MgCr_2O_4$ | No reactions found | 0. | 0. |
| Na | $MgCr_2O_4$ | No reactions found | 0. | 0. |
| Cl | $MgCr_2O_4$ | No reactions found | 0. | 0. |

Figure 3:
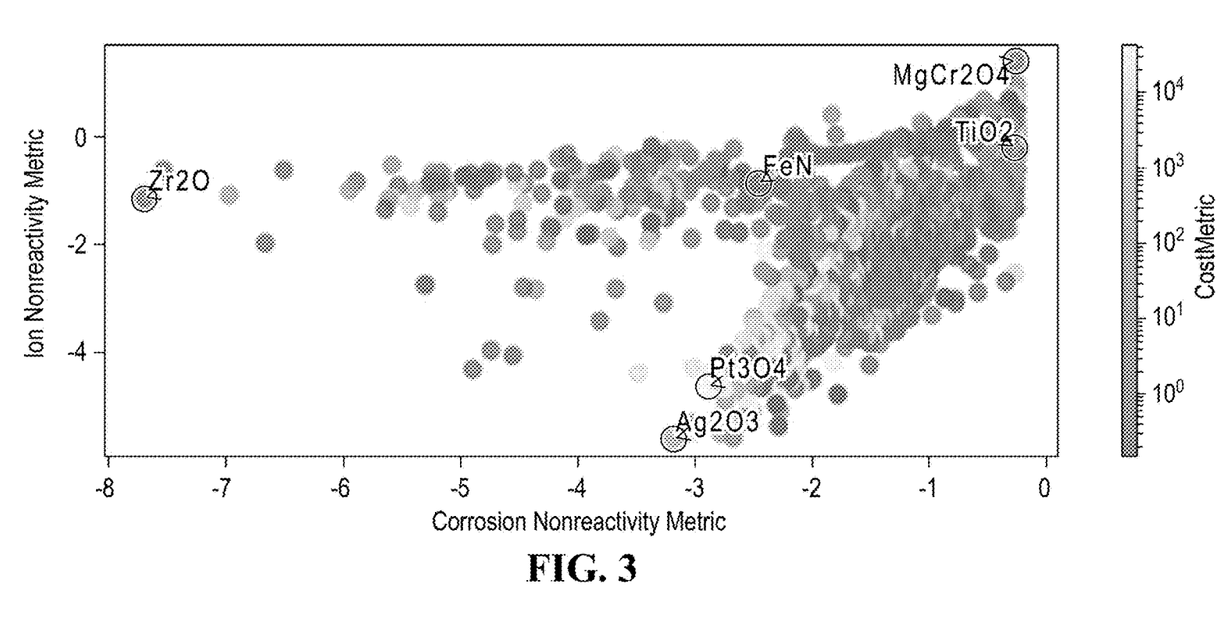
FIG. 3 depicts a plot of materials screened using a number of parameters (e.g., corrosion stability; ion stability; and cost).

FIG. 3 depicts a plot of materials screened using the parameters identified above. The plot shows a cost metric in USD/kg (elemental cost), and a reactivity metric relative to $TiO_2$ using the most-stable reaction of a thermodynamic interface. The top-right corner with cost of no more than $40/kg elemental cost includes the following materials as set forth in Table 4.

TABLE 4

| Material | Corrosion Nonreactivity Metric | Ion Nonreactivity Metric | Cost Metric |
|---|---|---|---|
| $MgCr_2O_4$ | −0.25 | 1.374 | 3.075 |
| $CaTiO_3$ | −0.25 | 0.472 | 7.686 |
| $ZrO_2$ | −0.25 | 0.462 | 2.741 |
| $Ca_2Ti_3O_8$ | −0.25 | 0.334 | 8.223 |
| $MgTiO_3$ | −0.25 | 0.24 | 8.081 |
| $MgTi_2O_5$ | −0.25 | 0.069 | 8.866 |
| $Na_2Ti_4O_9$ | −0.25 | 0.002 | 38.677 |
| $Na_2Ti_6O_{13}$ | −0.25 | −0.07 | 30.227 |
| $Na_2Ti_7O_{15}$ | −0.25 | −0.094 | 27.632 |
| $Na_2Ti_{12}O_{25}$ | −0.25 | −0.157 | 20.75 |
| $TiO_2$ | −0.25 | −0.25 | 10.048 |

TABLE 4-continued

| Material | Corrosion Nonreactivity Metric | Ion Nonreactivity Metric | Cost Metric |
|---|---|---|---|
| $Ca_2Nb_2O_7$ | −0.25 | −0.457 | 13.319 |
| $CaNb_2O_6$ | −0.25 | −0.772 | 14.887 |
| $MgNb_2O_6$ | −0.25 | −0.962 | 15.413 |
| $Na_2Nb_4O_{11}$ | −0.25 | −0.986 | 34.774 |
| $NaNb_3O_8$ | −0.25 | −1.117 | 29.312 |
| $NaNb_{13}O_{33}$ | −0.25 | −1.354 | 20.095 |
| $Mg_4Nb_2O_9$ | −0.256 | −0.311 | 12.233 |
| $CaTi_2O_5$ | −0.272 | 0.211 | 8.56 |
| $CaZr_4O_9$ | −0.277 | 0.528 | 2.902 |
| $Mg_2TiO_4$ | −0.297 | 0.38 | 7.102 |
| $TiNb_2O_7$ | −0.303 | −1.188 | 15.483 |
| $CaZrO_3$ | −0.306 | 0.656 | 3.235 |

From the data in Table 4, and in one or more embodiments, $MgCr_2O_4$ is used as a coating on a surface of a current conductor (e.g., a current collector or bipolar plate) of an electrochemical device for removing ions from a solution. In one or more embodiments, the $MgCr_2O_4$ is only applied as a surface coating to the compartment of the IDI that does not contact an ion-poor, freshwater stream because when $MgCr_2O_4$ is exposed to an ion-poor environment, $Cr^{6+}$ ions, which are toxic, may form. Only the compartment including the ion-rich, waste stream may include a current conductor having a $MgCr_2O_4$ coating.

In one or more embodiments the current conductor surface coating may include $M_xTiO_y$, where M=Ca, Mg, or Na; $0<x<2$; and $2<y<3$. x may be any of the following values or in the range of any two of the following values: 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, and 1.9. y may be any of the following values or in a range of any two of the following values: 2.1, 2.2, 2.3, 2.4, 2.5, 2.6, 2.7, 2.8, and 2.9. In yet other embodiments, the current conductor surface coating may include $AO_y$, where A=Zr, Ti, or Nb, and $2<y<3$. y may be any of the following values or in a range of any two of the following values: 2.1, 2.2, 2.3, 2.4, 2.5, 2.6, 2.7, 2.8, and 2.9.

The current conductor surface coating may include $M_xNbO_y$, or $M_xZrO_y$, where M=Ca, Mg, or Na; $0<x<2$; and $2<y<3$. x may be any of the following values or in the range of any two of the following values: 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, and 1.9. y may be any of the following values or in a range of any two of the following values: 2.1, 2.2, 2.3, 2.4, 2.5, 2.6, 2.7, 2.8, and 2.9. The current conductor surface coating may include any of the materials identified in Table 4 or any combination thereof.

In one or more embodiments, a method of applying an anti-corrosive, anti-reactive coating onto a current conductor surface of a current conductor substrate of a current conductor for use in an electrochemical device for removing ions from a solution is disclosed. The method includes applying the anti-corrosive, anti-reactive coating coated onto the current conductor surface, the anti-corrosive, anti-reactive coating containing a material with chemical composition of $AO_y$, where A=Zr, Nb, Ti, or a combination thereof, and $2<y<3$; $M_xAO_y$, where M=Ca, Mg, Na, or a combination thereof, A=Zr, Nb, Ti, or a combination thereof, $0<x<2$, and $2<y<3$; $MgCr_2O_4$; or a combination thereof.

The anti-corrosive, anti-reactive coating may be applied to the current conductor surface via a vapor deposition technique such as atomic layer deposition (ALD), physical layer deposition, or a sputtering process. The anti-corrosive, anti-reactive coating may be applied to the current conductor surface via solution deposition such as electroplating.

Figure 4:
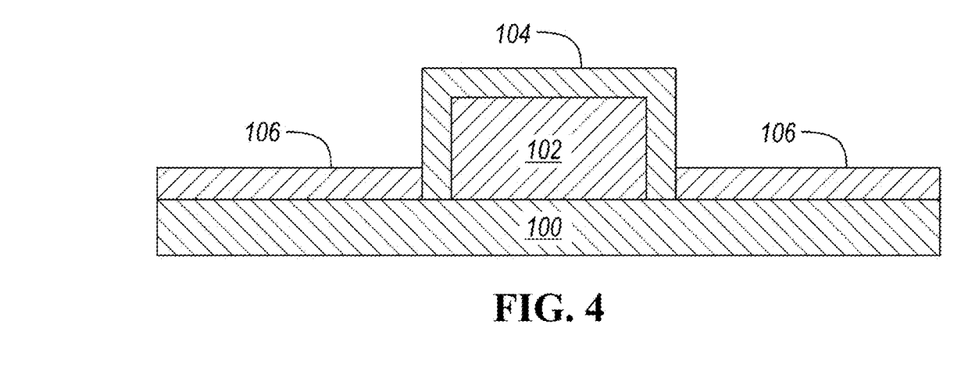
FIG. 4 depicts a schematic view of a process for selectively applying an anti-corrosive, anti-reactive coating to a current conductor.

In one or more embodiments, the anti-corrosive, anti-reactive coating may only be applied to the current conductor and not the electrode, which may prevent flow of ions to the intercalating agent in the electrode. FIG. 4 depicts a schematic view of a process for selectively applying anti-corrosive, anti-reactive coating 106 to current conductor 100. Current conductor 100 contacts cation capture electrode 102. The selective anti-corrosive, anti-reactive coating may be applied by depositing screen 104 over cation capture electrode 102, applying anti-corrosive, anti-reactive coating 106 to the surface of current conductor 100, and removing screen 104 (via etching or other removal process).

In one or more embodiments, the current conductor (e.g., a current collector or a bipolar plate) and the current conductor substrate may be formed of stainless steel, Ni, Pt, Cu, Ti, graphite, or a combination thereof.

In one or more embodiments, the anti-corrosive, anti-reactive coating may be applied to the current conductor substrate prior to forming (e.g., stamping) of the current conductor substrate to introduce geometry into the structure (e.g., flow fields in a bipolar plate). In other embodiments, the anti-corrosive, anti-reactive coating may be applied after forming (e.g., stamping) the current conductor substrate. The anti-corrosive, anti-reactive coating may be annealed at an elevated temperature to reduce the number of defects in the anti-corrosive, anti-reactive coating.

In one or more embodiments, a portion of the anti-corrosive, anti-reactive surface coating may be etched away to enhance the electrical contact from the current conductor substrate and the electrode. The etching may be formed throughout the length or width of the current conductor surface at regular intervals. The regular interval may be any of the following values or in a range of any two of the following values: 0.1, 0.5, 1, 2, 3, 4, 5, 6, 7, 8, 9, and 10 µm. The percentage of the surface having etched away surface coating may be any of the following values or in a range of any two of the following values: 1, 2, 3, 4, 5, 6, 7, 8, 9, 10, 15, 20, 25, 30, 40, 50, and 60%. The amount of etching may be determined by the intended tradeoff between "protected" current conductor and "conductive" current conductor.

The anti-corrosive, anti-reactive surface coating may have oxygen vacancies to enhance conductivity. The oxygen vacancies may be missing the following percentage of the nominal oxygen content or within a range of any of these two values: 1, 2, 3, 4, 5, 6, 7, 8, 9, and 10%. Oxygen vacancies may be applied to oxides including titanates and niobates to enhance conductivity. The anti-corrosive, anti-reactive surface coating may be a hybrid structure with islands or a combination of islands with any other structure identified above. The size of the islands may be any of the following values or in a range of any two of the following values: 10, 50, 100, 150, 200, 250, 300, 350, 400, 450, 500, 550, 600, 650, 700, 750, 800, 850, 900, 950, and 1,000 nanometers in size.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical device for removing ions from a solution, the electrochemical device comprising:
   first and second compartments divided by a first anion exchange membrane, the first and second compartments including first and second electrodes, respectively, the first and second compartments including first and second current conductors, respectively, the first current conductor being attached to the first electrode, the second current conductor being attached to the second electrode, the first compartment being configured to admit a first inlet stream of the solution and provide a first outlet stream of the solution, the second compartment being configured to admit a second inlet stream of the solution and provide a second outlet stream of the solution, the second current conductor including a second current conductor substrate having a second current conductor surface and an anti-corrosive, anti-reactive coating coated onto the second current conductor surface and containing a second material with a second chemical composition of $MgCr_2O_4$, and the anti-corrosive, anti-reactive coating coating 40 to 99% of the second current conductor surface.

2. The electrochemical device of claim 1, wherein the first current conductor is a current collector.

3. The electrochemical device of claim 1, wherein the anti-corrosive, anti-reactive coating includes 1 to 60% of an etched away anti-corrosive, anti-reactive coating.

4. The electrochemical device of claim 1, wherein the anti-corrosive, anti-reactive coating coats 40 to 90%.

5. The electrochemical device of claim 4, wherein the anti-corrosive, anti-reactive coating includes 10 to 60% of an etched away anti-corrosive, anti-reactive coating.

6. The electrochemical device of claim 1, wherein the first current conductor is a bipolar plate.

7. The electrochemical device of claim 1, wherein the second current conductor is a current collector.

8. The electrochemical device of claim 1, wherein the second current conductor is a bipolar plate.

9. An electrochemical device for removing ions from a solution, the electrochemical device comprising:
first and second compartments divided by a first anion exchange membrane, the first and second compartments including first and second electrodes, respectively, the first and second compartments including first and second current conductors, respectively, the first current conductor being attached to the first electrode, the second current conductor being attached to the second electrode, the first compartment being configured to admit a first inlet stream of the solution and provide a first outlet stream of the solution, the second compartment being configured to admit a second inlet stream of the solution and provide a second outlet stream of the solution, the second current conductor including a second current conductor substrate having a second current conductor surface and an anti-corrosive, anti-reactive coating coated onto the second current conductor surface and containing a second material with a second chemical composition of $MgCr_2O_4$, and the anti-corrosive, anti-reactive coating including a surface etching formed at a regular interval throughout a length or a width of the anti-corrosive, anti-reactive coating.

10. The electrochemical device of claim 9, wherein the regular interval is 0.1 to 10 μm.

11. The electrochemical device of claim 9, wherein the regular interval is 1 to 10 μm.

12. The electrochemical device of claim 9, wherein the surface etching is formed throughout lengths or widths of the anti-corrosive, anti-reactive coating.

13. The electrochemical device of claim 9, wherein the first current conductor is a current collector.

14. The electrochemical device of claim 9, wherein the first current conductor is a bipolar plate.

15. The electrochemical device of claim 9, wherein the second current conductor is a current collector.

16. The electrochemical device of claim 9, wherein the second current conductor is a bipolar plate.

17. An electrochemical device for removing ions from a solution, the electrochemical device comprising:
first and second compartments divided by a first anion exchange membrane, the first and second compartments including first and second electrodes, respectively, the first and second compartments including first and second current conductors, respectively, the first current conductor being attached to the first electrode, the second current conductor being attached to the second electrode, the first compartment being configured to admit a first inlet stream of the solution and provide a first outlet stream of the solution, the second compartment being configured to admit a second inlet stream of the solution and provide a second outlet stream of the solution, the second current conductor including a second current conductor substrate having a second current conductor surface and an anti-corrosive, anti-reactive coating coated onto the second current conductor surface and containing a second material with a second chemical composition of $MgCr_2O_4$, and the anti-corrosive, anti-reactive coating includes an island structure including islands.

18. The electrochemical device of claim 17, wherein the islands have sizes in the range of 10 to 1,000 nanometers.

19. The electrochemical device of claim 17, wherein the first current conductor is a current collector.

* * * * *